(12) United States Patent
Ryu et al.

(10) Patent No.: US 8,363,008 B2
(45) Date of Patent: Jan. 29, 2013

(54) MOBILE TERMINAL AND EVENT CONTROL METHOD THEREOF

(75) Inventors: Hye-Jin Ryu, Seoul (KR); Jun-Serk Park, Seoul (KR); Kang-E Lee, Seoul (KR); Kun-Ho Lee, Seoul (KR); Joo-Sun Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 625 days.

(21) Appl. No.: 12/506,279

(22) Filed: Jul. 21, 2009

(65) Prior Publication Data

US 2010/0020035 A1    Jan. 28, 2010

(30) Foreign Application Priority Data

Jul. 23, 2008   (KR) .................. 10-2008-0071931

(51) Int. Cl.
*G09G 5/00* (2006.01)
(52) U.S. Cl. ..................... 345/156; 345/173
(58) Field of Classification Search .......... 345/156, 345/179; 715/863
See application file for complete search history.

(56) References Cited

U.S. PATENT DOCUMENTS

| | | | |
|---|---|---|---|
| 7,657,849 B2 * | 2/2010 | Chaudhri et al. | 715/863 |
| 7,900,823 B1 * | 3/2011 | Knouff et al. | 235/379 |
| 8,108,000 B2 * | 1/2012 | Chang et al. | 455/556.1 |
| 8,125,312 B2 * | 2/2012 | Orr | 340/5.31 |
| 8,130,206 B2 * | 3/2012 | Lindroos | 345/173 |
| 2004/0085351 A1 * | 5/2004 | Tokkonen | 345/741 |
| 2005/0060554 A1 * | 3/2005 | O'Donoghue | 713/183 |
| 2007/0031010 A1 * | 2/2007 | Sukegawa et al. | 382/118 |
| 2007/0150842 A1 | 6/2007 | Chaudhri et al. | |
| 2008/0136587 A1 * | 6/2008 | Orr | 340/5.31 |
| 2008/0165116 A1 * | 7/2008 | Herz et al. | 345/102 |
| 2008/0168290 A1 | 7/2008 | Jobs et al. | |
| 2009/0241072 A1 * | 9/2009 | Chaudhri et al. | 715/863 |
| 2011/0172737 A1 * | 7/2011 | Davis et al. | 607/59 |
| 2012/0084259 A1 * | 4/2012 | Welingkar et al. | 707/647 |
| 2012/0117643 A1 * | 5/2012 | Orr | 726/19 |

FOREIGN PATENT DOCUMENTS

| | | |
|---|---|---|
| DE | 10228568 A1 | 1/2004 |
| WO | WO-2006/013521 A2 | 2/2006 |
| WO | WO-2006/115946 A2 | 11/2006 |

* cited by examiner

*Primary Examiner* — Ricardo L Osorio
(74) *Attorney, Agent, or Firm* — Birch, Stewart, Kolasch & Birch, LLP

(57) ABSTRACT

Disclosed is an event control method of a mobile terminal, in which when a touch input is detected, a shape and size of a lock screen is changed according to the detected touch input value (e.g., touch time, the number of touch times or touch area) and simultaneously a threshold value necessary for unlocking the lock screen 50 is displayed, and then the lock screen is unlocked and switched to a menu screen when the touch input value reaches the threshold value, resulting in providing a user with more enjoyable and exciting user interface (UI).

19 Claims, 19 Drawing Sheets

MOBILE TERMINAL AND EVENT CONTROL METHOD THEREOF

CROSS-REFERENCE TO A RELATED APPLICATION

Pursuant to 35 U.S.C. §119(a), this application claims the benefit of earlier filing date and right of priority to Korean Application No. 10-2008-0071931, filed on Jul. 23, 2008, the contents of which is incorporated by reference herein in its entirety.

BACKGROUND OF THE INVENTION

1. Field of the Invention

The present invention relates to an event generation in a mobile terminal, and particularly, to an event control method of a mobile terminal which generates a particular event according to a touch threshold value.

2. Background of the Invention

Mobile terminals may be configured to perform various functions, for example, data and voice communication, capturing images or video, storing voice, reproducing music files via a speaker system, displaying images or video and the like. Some of mobile terminals may include an additional function of playing games, and other mobile terminals may be implemented as multimedia players. In addition, in recent time, mobile terminals can receive broadcast or multicast signals to allow viewing of video or television programs.

Furthermore, many efforts are undergoing to support or enhance various functions of such mobile terminals. Such many efforts include not only changes and improvement of structural components implementing a mobile terminal but also software or hardware improvement.

Among others, a touch function of the mobile terminal allows even users, who are not familiar to input buttons or keys, to conveniently operate the mobile terminal using a touch screen. Recently, in addition to a simple touch input, such touch function is being established as an important function of the mobile terminal together with a user interface (UI). Hence, as the touch function is applied to the mobile terminal in more various configurations, whereby development of UIs appropriate for different configurations is further required.

SUMMARY OF THE INVENTION

Therefore, an object of the present invention is to provide a mobile terminal capable of controlling the locking of a screen thereof according to an input of a touch threshold value, and an event control method thereof.

Another object of the present invention is to provide a mobile terminal capable of generating an event when a touch value reaches a predetermined threshold value, and an event control method thereof.

Another object of the present invention is to provide a mobile terminal capable of performing a screen switching (conversion) when a specific portion on a screen is touched for a preset time, and an event control method thereof.

Another object of the present invention is to provide a mobile terminal capable of entering (opening, switching to) another menu from a lock mode thereof in cooperation with a touch input for a preset time, and an event control method thereof.

To achieve these and other advantages and in accordance with the purpose of the present invention, as embodied and broadly described herein, there is provided an event control method of a mobile terminal including, detecting a touch input, displaying a threshold value according to the detected touch input value, changing shape and size of a lock screen according to the change in the touch input value, and switching the lock screen to a menu screen when the touch input value reaches the threshold value.

The touch input may include a real-touch and a proximity touch.

The touch input value may include a touch time or a touch area.

The touch input may be performed by touching a key block separately disposed at one side of the lock screen or one side of the lock screen.

The lock screen may include various avatars each having shape, size and movement all changed according to the change in the touch input.

The lock screen may be changed in shape and size thereof according to the change in the touch input value, and vibration and sound may be output according to the change in the shape and size of the lock screen.

The shape and size of the lock screen may be recovered to an initial state thereof when the touch input is released before the touch input value reaches the threshold value.

In one aspect of the present invention, there is provided a mobile terminal including, a sensing unit configured to detect a touch input, a display configured to display a lock screen with a specific touch region, and a controller configured to display a threshold value on the display according to the detected touch input value, and switch the lock screen to a menu screen when the touch input value reaches the threshold value.

The touch input may include a real-touch and a proximity touch.

The touch input value may include a touch time or a touch area.

The touch input may be performed by touching a key block separately disposed at one side of the lock screen or one side of the lock screen.

The display may include a lock screen, and a key block disposed on a specific portion on the lock screen and receiving a touch input thereon, and the key block may have a separate display region for displaying the threshold value.

The display may include various avatars each having shape, size and movement all changed according to the change in the touch input.

The controller may change the shape and size of the lock screen according to the change in the touch input value, and output vibration and sound according to the change in the shape and size of the lock screen.

The controller may recover the shape and size of the lock screen to an initial state thereof when the touch input is released before the touch input value reaches the threshold value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

A mobile terminal may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
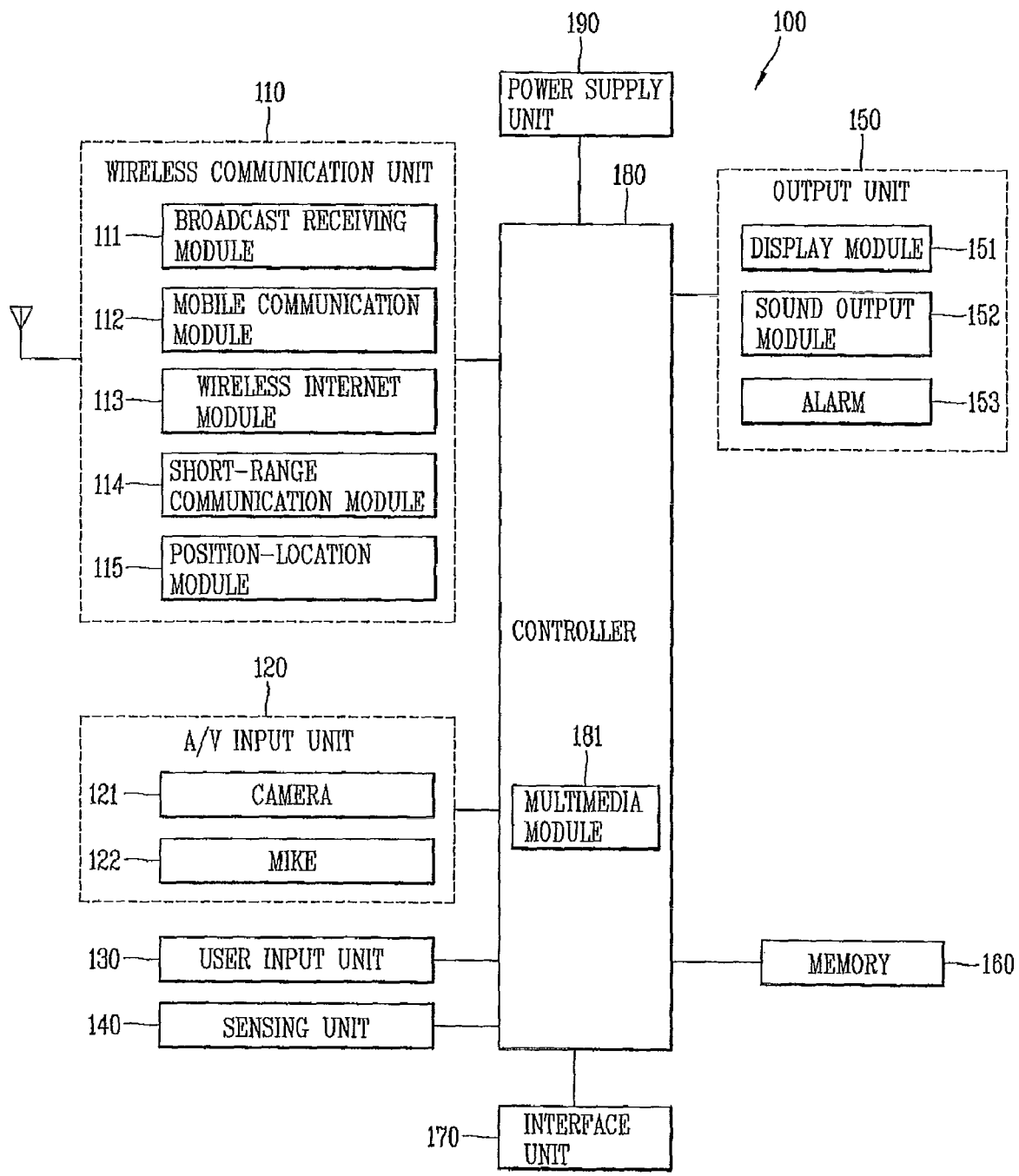
FIG. 1 is a block diagram of a mobile terminal in accordance with one embodiment of the present invention.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal.

The wireless internet module 113 supports wireless Internet access for the mobile terminal. This module may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like.

Here, the sensing unit 140 may include a proximity sensor 141, which will be described later in relation to a touch screen.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The proximity sensor 141 may be disposed inside the touch screen or near the touch screen. The proximity sensor 141 denotes a sensor for detecting whether there is an object approaching a certain detection surface or existing near the certain detection surface by using a force of an electromagnetic field or infrared rays, without any mechanical contact. Therefore, the proximity sensor 141 has a considerably long lifespan as compared to a contact sensor and also implement considerably high utility.

Examples of the proximity sensor 141 may include a transmission type photo sensor, a direct reflection type photo sensor, a mirror reflection type photo sensor, a high frequency oscillation type proximity sensor, a capacitive proximity sensor, a magnetic proximity sensor, an infrared proximity sensor and the like.

Among others, explaining a principle as to how the high frequency oscillation type proximity sensor operates, when an object to be detected becomes close to a sensor detection surface in a state of oscillating a high frequency from an oscillatory circuit, oscillatory amplitude of the oscillatory circuit is attenuated or stopped. Such change is converted into an electrical signal to detect an existence of the object to be detected. Thus, even if any material other than metal is positioned between the high frequency oscillation type proximity touch and the object to be detected, a proximity switch may detect the object to be detected without any interruption of the material.

Even without the proximity sensor 141 mounted, if an electrostatic touch screen is provided, the proximity of a pointer can be detected based upon the change in an electric field due to the proximity of the pointer.

Therefore, if the pointer is located near the touch screen without being actually contacted with each other, the location of the pointer and the distance (gap) between the pointer and the touch screen can be detected. Hereinafter, for the sake of explanation, a behavior that the pointer is located near the touch screen so as to be recognized as being located above the touch screen is referred to as "proximity touch," and a behavior that the pointer is actually contacted with the touch screen is referred to as "contact touch." Also, the location at which the proximity touch of the pointer is recognized above the touch screen denotes a location at which the pointer is located perpendicularly to the touch screen in case of the proximity touch of the pointer.

The use of the proximity sensor 141 allows the detection of proximity touch and proximity touch patterns (e.g., proximity touch distance, proximity touch direction, proximity touch speed, proximity touch time, proximity touch location, proximity touch movement state and the like), and also allows the output on the touch screen of information related to the detected proximity touch operation and the proximity touch pattern.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be outputted via the display 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As mentioned above, the internal components of the mobile terminal related to the present invention have been described from the perspective of their functions. Hereinafter, external components of the mobile terminal related to the present invention will be described from the perspective of their functions with reference to FIGS. 2 and 3. The mobile terminal may be implemented in a variety of different configurations. Examples of such configurations include folder type, slide type, bar type, rotating type, swing type or the like. For the sake of brief explanation, further disclosure will primarily relate to a slide-type mobile terminal. However, the present invention may not be limited to the slide-type mobile terminal, but can be applied to other types of terminals including the aforesaid types of terminals.

Figure 2:
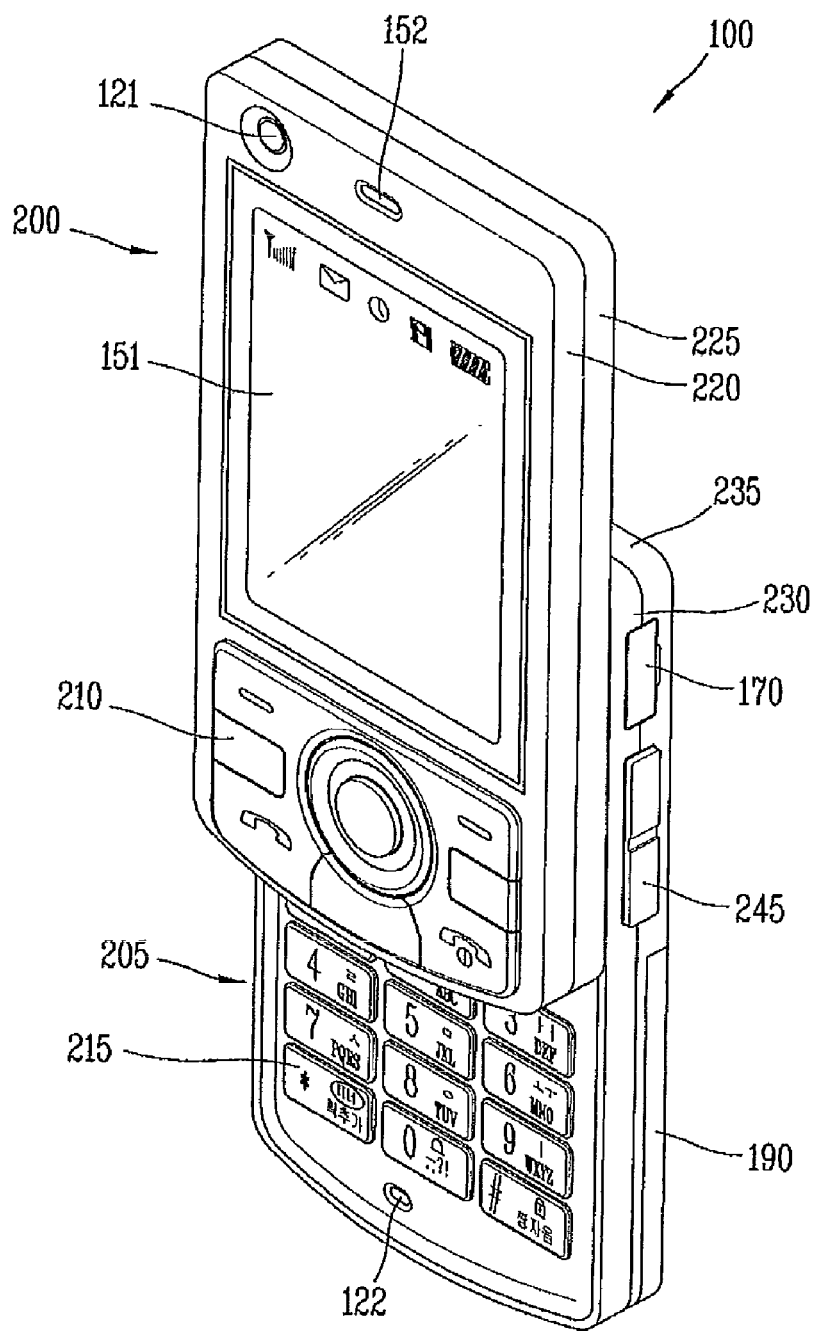
FIG. 2 is a front perspective view of the mobile terminal in accordance with the one embodiment of the present invention.

FIG. 2 is a front perspective view of a mobile terminal in accordance with one embodiment of the present invention.

The mobile terminal 100 of the present invention may comprise a first body 200, and a second body 205 configured to slidably cooperate with the first body 200 in at least one direction. For a folder-type mobile terminal, the mobile terminal 100 may include a first body, and a second body 205 configured to have at least one side folded or unfolded with respect to the first body 200.

The first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position).

In the meantime, the mobile terminal according to the present invention, although not shown in the drawing, may be a folder-type mobile terminal including a first body and a second body having one side folded or unfolded with respect to the first body. Here, the folded state of the second body can be referred to as the closed configuration, whereas the unfolded state of the second body can be referred to as the open configuration.

In addition, the mobile terminal according to the present invention, although not shown in the drawing, may be a swing-type mobile terminal including a first body and a second body capable of being swung with respect to the first body. Here, the state that the first body is overlapped with the second body can be referred to as the closed configuration whereas the state that the second body is swung thus to make the first body partially exposed can be referred to as the open configuration.

Even if any separate description is not given of the folder-type mobile terminal and the swing-type mobile terminal, it can be easily understood by those skilled in the art and thus a detailed description thereof will not be repeated.

The mobile terminal may be operable in a standby (idle) mode when in the closed configuration, but this mode can be released by the user's manipulation. Also, the mobile terminal may typically be operable in an active (phone call) mode in the open configuration. Here, this mode may be changed into the idle mode according to the user's manipulation or after a certain time elapses.

A case (housing, casing, cover, etc.) forming the outside of the first body 200 is formed by a first front case 220 and a first rear case 225. Various electronic components may be disposed in a space between the first front case 220 and the first rear case 225. One or more intermediate cases may additionally be disposed between the first front case 220 and the first rear case 225.

The cases can be formed of resin in a manner of injection molding, or formed using metallic materials such as stainless steel (STS) and titanium (Ti).

A display 151, an audio output module 152, a camera 121 or a first user input unit 210 may be disposed at the first front case 220 of the first body 200.

The display 151 has been described in connection with FIG. 1, so its detailed description will not be repeated for the sake of brief explanation.

The audio output module 152 may be implemented as a speaker.

The camera 121 may be implemented to be suitable for a user to capture still images or video.

Like the first body 200, a case configuring the outside of the second body 205 may be formed by a second front case 230 and a second rear case 235.

The second user input unit 215 may be disposed at the second body 205, in detail, at a front face of the second front case 230.

A third user input unit 245, a microphone 122 and an interface unit 170 may be disposed either at the second front case 230 or at the second rear case 235.

The first to third user input units 210, 215 and 245 may be named as a user input unit 130. Any tactile manner that a user can touch, e.g., the display 151, for manipulation can be employed for the user input unit 130.

For example, the user input unit 130 can be implemented as a dome switch or touchpad which a user can input information in a pushing or touching manner, or implemented in a manner of using a wheel, a jog or a Joystick to rotate keys.

Regarding each function, the first user input unit 210 is used for inputting commands such as START, END, SCROLL or the like, and the second user input unit 215 is used for inputting numbers, characters, symbols, or the like. The first user input unit 210 may include so-called soft keys used in cooperation with icons displayed on the display module 151, and navigation keys (usually composed of four navigation keys and a central key) for indicating and confirming an orientation.

Also, the third user input unit 245 can be operated as a hot key for activating a specific function within the mobile terminal.

The microphone 122 may be implemented to be suitable for receiving user's voice or various sounds.

The interface unit 170 may be used as a passage through which the terminal related to the present invention can exchange data or the like with an external device. The interface unit 170 has been described in connection with FIG. 1, so its detailed description will be omitted. The power supply 190 may be disposed at a side of the second rear case 235 to provide power to the mobile terminal.

The power supply 190 may be a rechargeable battery, for example, to be attachable/detachable for charging.

Figure 3:
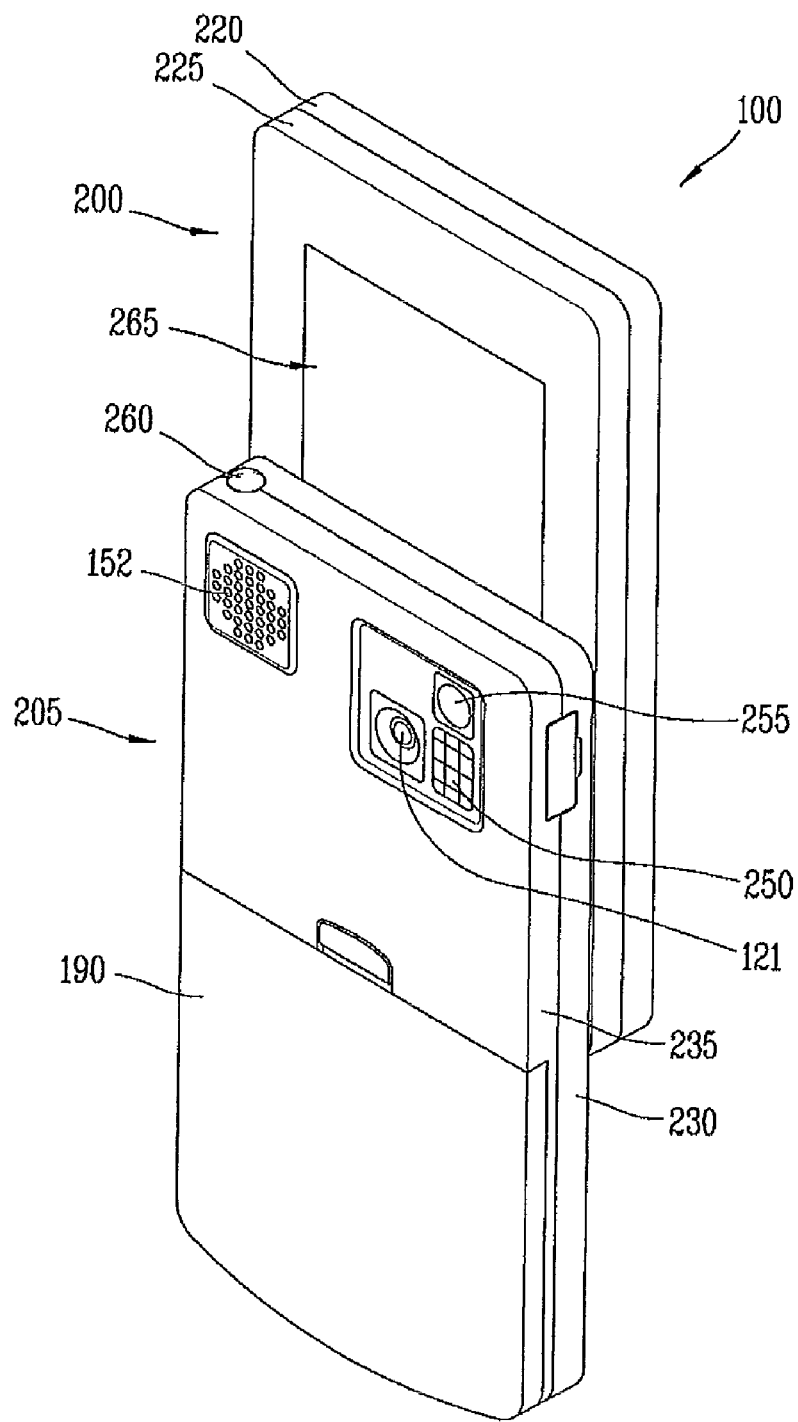
FIG. 3 is a rear perspective view of the mobile terminal in accordance with the one embodiment of the present invention.

FIG. 3 is a rear perspective view of the mobile terminal of FIG. 2.

As shown in FIG. 3, a camera 121 may further be disposed at a rear face of the second rear case 235 of the second body 205. The camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use.

A flash 250 and a mirror 255 may additionally be disposed adjacent to the camera 121 of the second body 205. The flash 250 operates in conjunction with the camera 121 of the second body 250 when taking a picture using the camera 121 of the second body 205. The mirror 255 can cooperate with the camera 121 of the second body 205 to allow a user to photograph himself in a self-portrait mode.

The second rear case 235 may further include an audio output module 152.

The audio output module 152 of the second body 205 can cooperate with the audio output module 152 of the first body 200 to provide stereo output. Also, the audio output module 152 may be configured to operate as a speakerphone.

A broadcast signal receiving antenna 260 may be disposed at one side of the second rear case 235, in addition to an antenna for communications. The antenna 260 can be configured to retract into the second body 205.

One part of a slide module 265 which allows the first body 200 to be slidably coupled to the second body 205 may be disposed at the first rear case 225 of the first body 200.

The other part of the slide module 265 may be disposed at the second front case 230 of the second body 205, such that it may not be exposed to the exterior as illustrated in the drawing of the present invention.

As such, it has been described that the camera 121 is disposed at the second body 205; however, the present invention may not be limited to the configuration.

For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may be configured to operate within a communication system which transmits data via frames or packets, including both wireless and wireline communication systems, and satellite-based communication systems.

Hereinafter, a communication system within which the mobile terminal related to the present invention can operate will be described with reference to FIG. 4.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
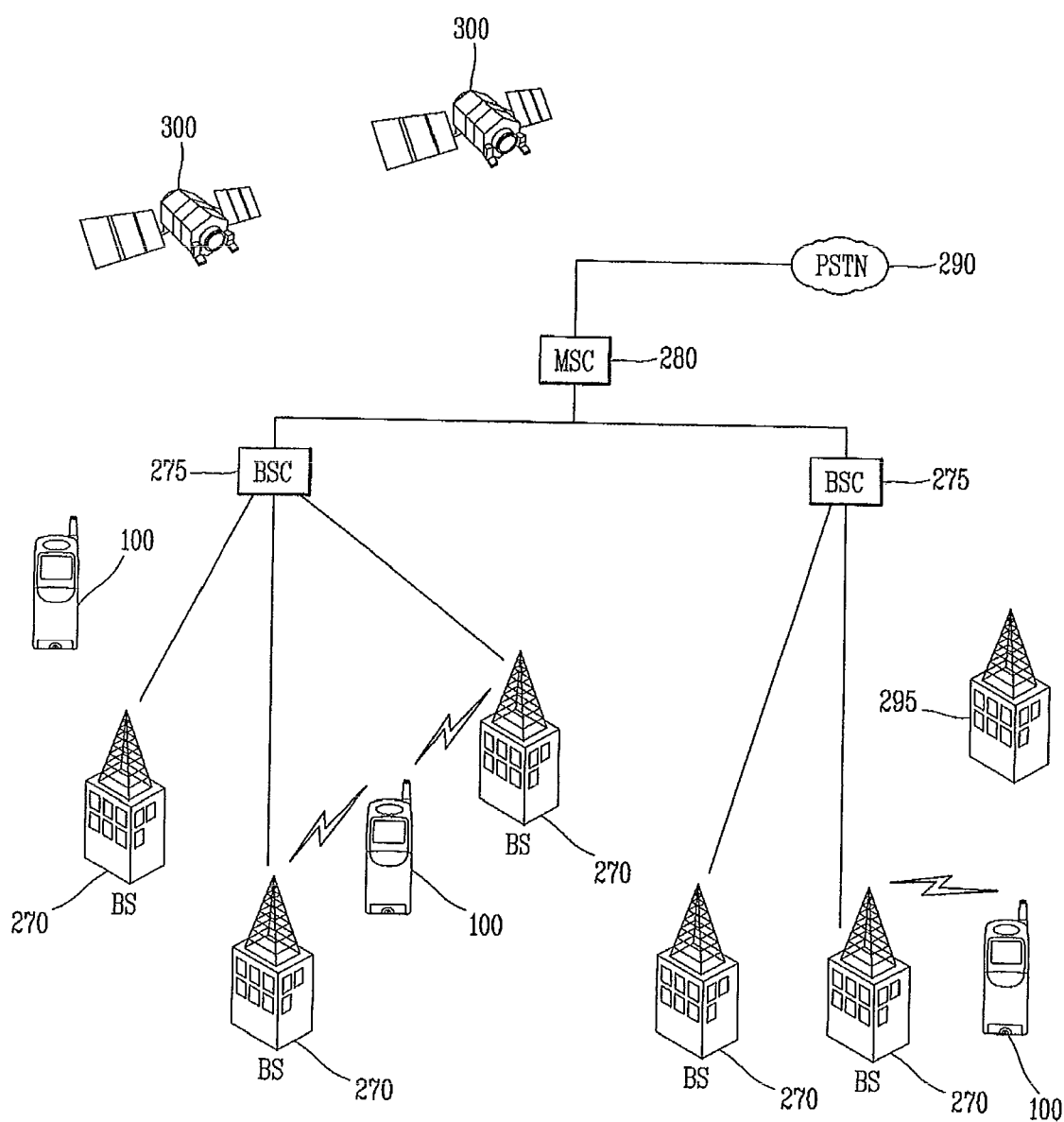
FIG. 4 is a block diagram of a wireless communication system) operable with the mobile terminal in accordance with the one embodiment of the present invention.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 4, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

The display 151 or the touch pad 135 of FIG. 1 may be scrolled to receive a touch input. A user may scroll the display 151 or the touch pad 135 to move a cursor or pointer positioned on an object (subject), e.g., an icon or the like, displayed on the display 151. In addition, in case of moving a finger on the display 151 or the touch pad 135, the path of the finger being moved may be visibly displayed on the display 151, which can be useful upon editing an image displayed on the display 151.

One function of the mobile terminal may be executed in correspondence with a case where the display 151 (touch screen) and the touch pad 135 are touched together within a preset time. An example of being touched together may include clamping a terminal body with the user's thumb and index finger. The one function may be activating or deactivating of the display 151 or the touch pad 135.

The proximity sensor 141 having described with reference to FIG. 1 will be described in more detail with reference to FIG. 5.

Figure 5:
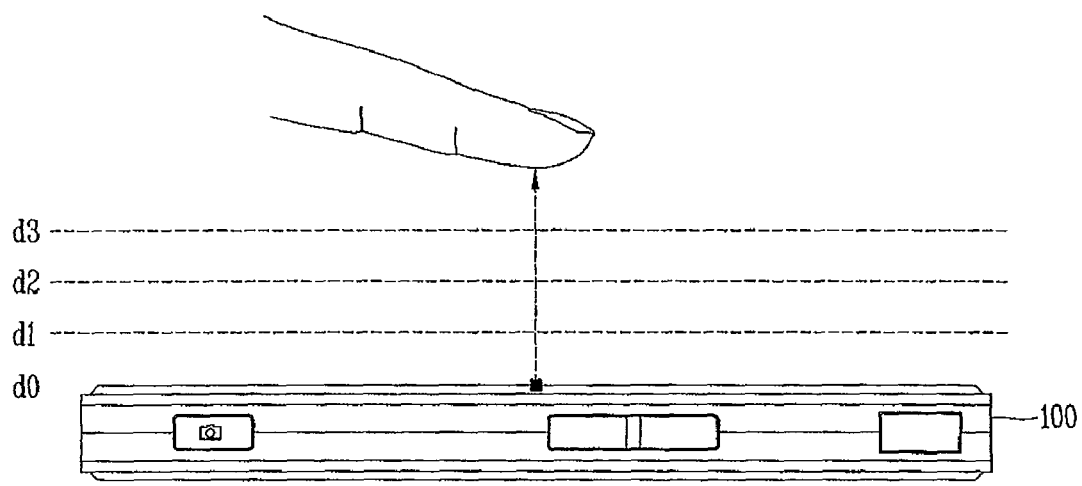
FIG. 5 is an overview showing a proximity depth of a proximity sensor.

FIG. 5 is an overview showing a proximity depth of the proximity sensor.

As shown in FIG. 5, if a pointer, such as a user's finger, a pen or the like, approaches the touch screen, the proximity sensor 141 disposed within the touch screen or near the touch screen senses (detects) the approach, and thus outputs a proximity signal.

The proximity sensor 141 may be configured to output different proximity signals depending on a distance between the approached pointer and the touch screen (hereinafter, referred to as "proximity depth").

FIG. 5 exemplarily shows a section of the touch screen having the proximity sensor, which can detect three proximity depths, for example. However, a proximity sensor which can detect less than three proximity depths or more than four proximity depths may be employed.

In detail, if the pointer completely contacts the touch screen (see d0), it may be recognized as a contact touch. If the pointer is spaced apart from the touch screen by less than a distance d1, it may be recognized as a proximity touch with a first proximity depth. If the pointer is positioned above the touch screen between the distance d1 and a distance d2, it may be recognized as a proximity touch with a second proximity depth. If the pointer is spaced apart from the touch screen by more than the distance d2 and less than a distance d3, it may be recognized as a proximity touch with a third proximity depth. If the pointer is positioned above the touch screen farther than the distance d3, it may be recognized as the proximity touch being released.

Hence, the controller 180 may recognize the proximity touches as various input signals according to the proximity depths and proximity positions of the pointer, so as to control various operations.

A touch in the present invention may denote a real-touch or contact touch, and indicate that the pointer actually touches a screen. Also, a proximity touch in the present invention, as shown in FIG. 5, may indicate that the pointer does not actually touch the screen but is positioned close to the screen by being spaced apart therefrom by a particular distance. Preferably, the pointer may include an object for performing a real-touch or a proximity touch on a specific portion of a display screen, example of which may include a stylus pen, a finger and the like.

Referring to FIG. 1, the controller 180 in relation to the one embodiment of the present invention may recognize a real-touch or a proximity touch as a particular signal input, so as to control an event of the mobile terminal. That is, the controller 180 according to the one embodiment of the present invention may control an event of the mobile terminal 100, for example, when a pointer contacts a screen or moves close to a screen within a range of a preset distance.

The preset distance, as shown in FIG. 5, indicates a perpendicular distance between the pointer and the screen, and the event may include a screen conversion.

Referring back to FIG. 1, the mobile terminal 100 in accordance with the one embodiment of the present invention may detect a real-touch or proximity touch via a sensing unit 140. The sensing unit 140 may be provided with various sensors for performing different sensing functions, example of which may include a proximity sensor and /or a tactile sensor for detecting a proximity touch and/or a real-touch, and the like.

Further, the sensing unit 140 may detect a touch time or touch area for a real-touch, and detect a proximity distance or proximity speed for a proximity touch. The proximity distance indicates a distance that the pointer is spaced apart from the screen. In particular, a minimum proximity distance indicates a shortest distance that the pointer is spaced apart from the screen. Also, the proximity speed may include a speed at which the pointer approaches the screen or a speed at which the pointer moves away from the screen.

The sensing unit 140 may detect a touch-drag or proximity-drag in relation to the real-touch and/or proximity touch. The sensing unit 140 may detect various information related to a dragged direction of the touch-drag and/or proximity-drag, a dragged speed, a dragged distance, and the like. The touch-drag indicates that a touched point (portion) is dragged in a state that a real-touch is maintained, and the proximity-drag indicates that a touched point is dragged in a state that a proximity touch is maintained.

The present invention proposes a method in which a particular event is generated only when a touch value input by a real-touch or proximity touch reaches a predetermined threshold value (e.g., touch time, the number of touch times, touch area, touch distance, etc.).

The event may include a screen unlocking of the mobile terminal or a screen conversion (switching). To this end, the present invention is configured to display a threshold value for a touch input and the change in a screen while reaching the threshold value, and recover the screen to its initial state when the input touch value does not reach the threshold value.

Figure 6:
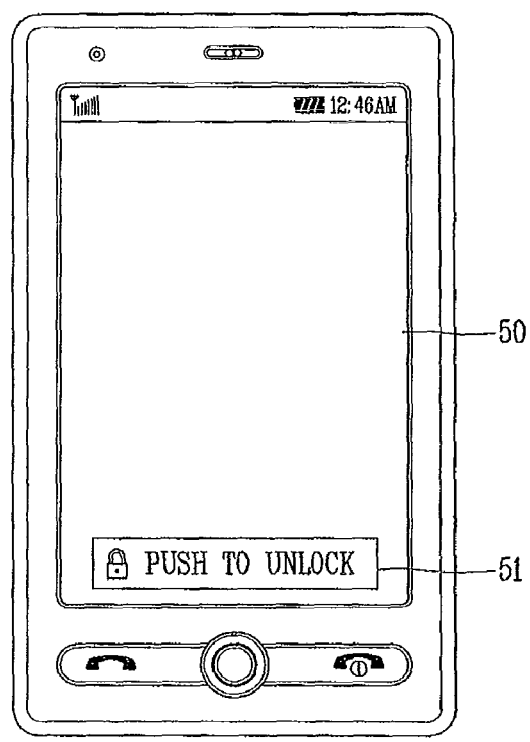
FIG. 6 is a view showing an initial screen of a mobile terminal in accordance with an embodiment of the present invention.

FIG. 6 shows an initial screen of the mobile terminal in accordance with one embodiment of the present invention.

As shown in FIG. 6, when the mobile terminal is turned on, a lock screen (locked screen) 50 of the mobile terminal as an initial screen and a particular key block 51 for unlocking the screen are displayed in the middle of a lower portion of the lock screen 50. The lock screen 50 is one surface, on which any menu is not displayed, among six surfaces of a cube, and may be configured to rotate when a touch input corresponding to a threshold value is generated by a user. The key block 51 is a software key with specific shape and size and may react with a touch (i.e., real-touch or proximity touch).

Figure 7:
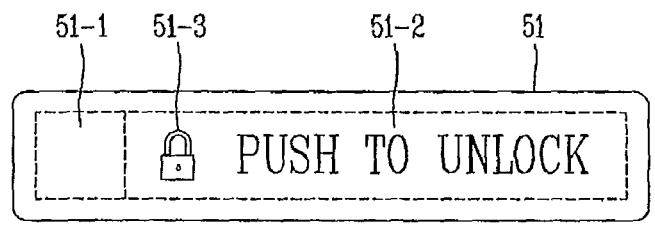
FIG. 7 is a detailed construction view of a key block for releasing a locked state of FIG. 6.

FIG. 7 shows a detailed configuration of the key block 51 for unlocking the screen.

As shown in FIG. 7, the key block 151 may be provided with a display region 51-1 at one side thereof, and a touch region 51-2 occupying the other portion except for the display region 51-1 for detecting a touch input. The touch region 51-2 may display an indication (or icon) 51-3 in a shape of a padlock indicating a locked state (or a locked screen) of the mobile terminal and a phrase (e.g., Push to unlock) (or a sentence) for guiding an unlocking method.

Figure 8:
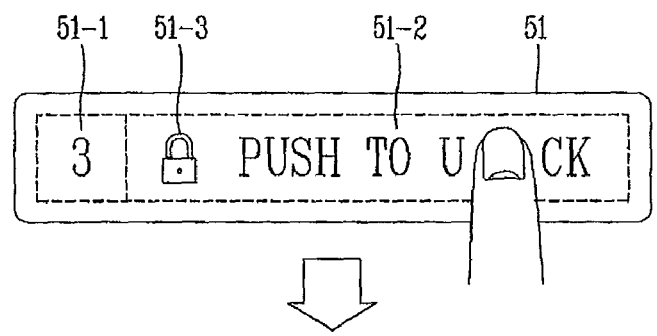
FIG. 8 is an exemplary view showing a situation in which a locked state is released by a touch in accordance with one embodiment of the present invention.
Figure 8:
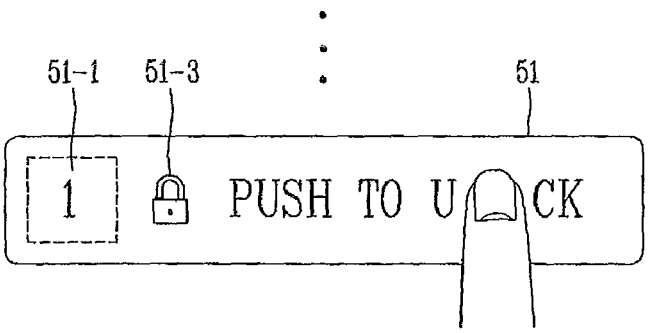
Figure 8:
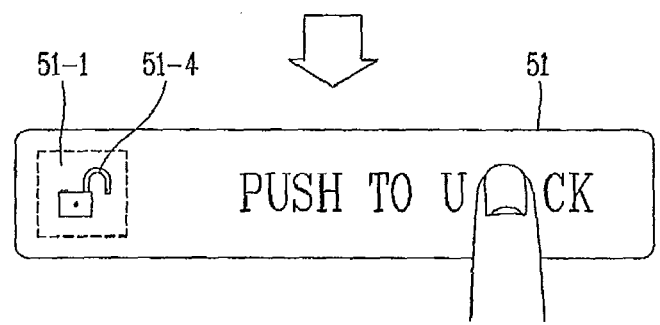

FIG. 8 schematically shows a situation of unlocking a screen by a touch input on the key block 51 shown in FIG. 7.

When a user touches the touch region 51-2 on the key block 51 according to the displayed guiding phrase, a threshold value (e.g., 3 seconds) for which a touch state is maintained is displayed on the display region 51-1 for releasing the current locked state. The threshold value (i.e., the time) is decreased (shortened) and displayed as time elapses. If the time is further shortened to become "0" second, the indication (or icon)

indicating that the screen is unlocked (e.g., a shape 51-4 of an unlocked padlock) is displayed on the display region 51-1.

Therefore, displaying the shape of the unlocked padlock indicates that the locked state of the mobile terminal is released. In this state, a particular event is generated, namely, the lock screen 50 then rotates upwardly (or downwardly or horizontally), such that one surface of a cube having menus displayed is displayed on a front surface of the mobile terminal. Hereinafter, an operation of releasing the locked state of the mobile terminal by touching the key block 51 will be described.

Figure 9:
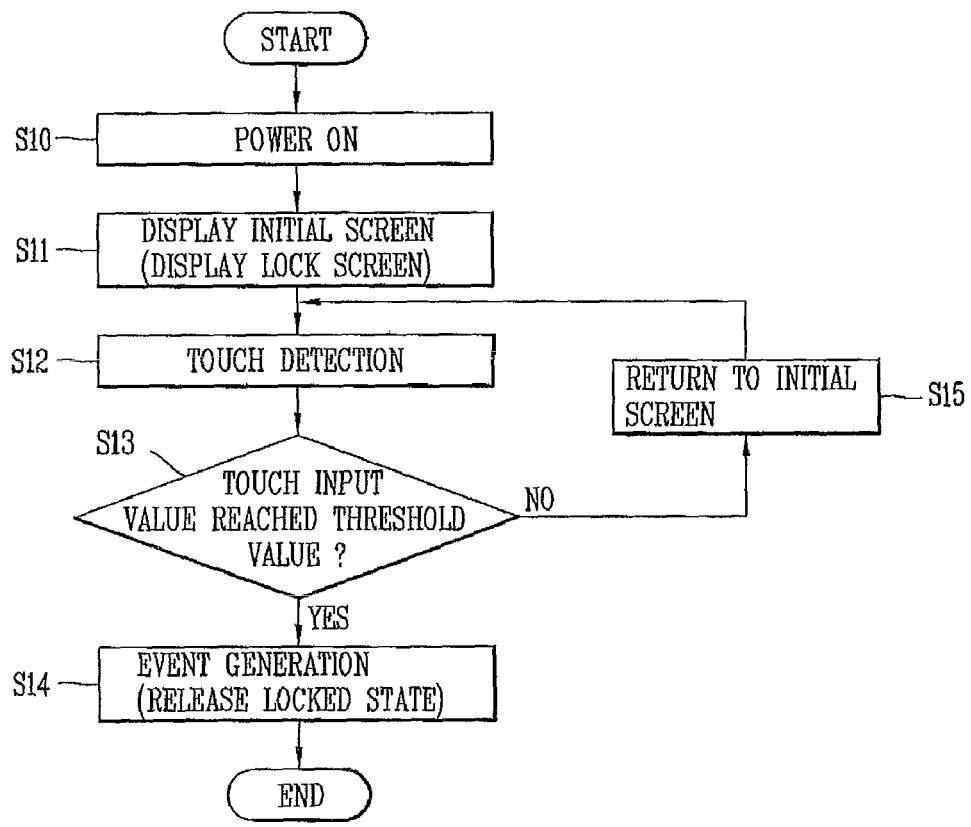
FIG. 9 is a flowchart showing an event control method of a mobile terminal in accordance with the embodiment of the present invention.

FIG. 9 is a flowchart showing an event control method of a mobile terminal in accordance with one embodiment of the present invention.

As shown in FIG. 9, when the mobile terminal is turned on (S10), the controller 180 executes a program stored in the memory 160, thus to display the lock screen 50 and the key block 51 on an initial screen, namely, on the display 151, as shown in FIG. 6 (S11). The lock screen 50 indicates a surface on which any menu is not displayed among six surfaces of a cube.

Under this state, when a user touches the touch region 51-2 of the key block 51 by use of a pointer to release the locked state of the mobile terminal, the controller 180 detects a touch time and a touch area via the sensing unit 140 (S12). Accordingly, the controller 180 checks whether the touch value (i.e., touch time and touch area) reaches a threshold value (S13). That is, the controller 180 checks whether the touch region 51-2 of the key block 51 has been pressed for a preset period of time, whether the touch region 51-2 has been touched a preset number of times within the preset period of time, or whether the touch region 51-2 has been touched by a preset pressure, thereby determining whether the touch input value reaches the threshold value.

If the touch value (i.e., touch time, touch area or the number of touch times) has reached the threshold value according to the check result, the controller 180 displays an icon (e.g., the unlocked padlock) indicating that the locked state has been released, and the lock screen 50 is switched to a menu screen (S14). Here, the screen switching may be implemented such that the surface of the cube corresponding to the lock screen 50 is disappeared (moved up) and a surface with menus being displayed is appeared (moved up from the bottom).

On the other hand, if the touch value has not reached the threshold value, that is, if the user releases the touch (e.g., takes his finger away) before reaching the threshold value, the controller 180 returns to the initial screen and repeats the step S12 (S15). Here, the returning to the initial screen may be executed when the touch time is shorter than a time for releasing the locked state.

Thus, the controller 180 displays the threshold value on the screen, and simultaneously returns the screen to the initial state when the touch input value has not reached the threshold value (e.g., the locked state is maintained). Further, the controller 180 may generate different effects (sound or vibration feedbacks) with respect to a successful or unsuccessful unlocking.

Figure 10:
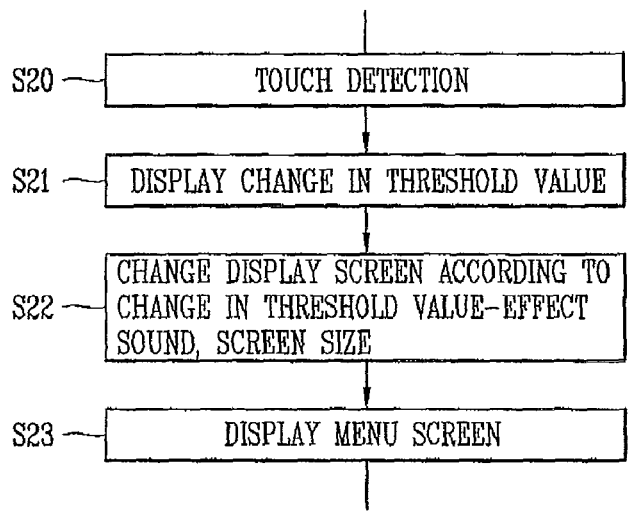
FIG. 10 is a flowchart showing the change in a lock screen upon a touch being input in FIG. 9.
Figure 11A:
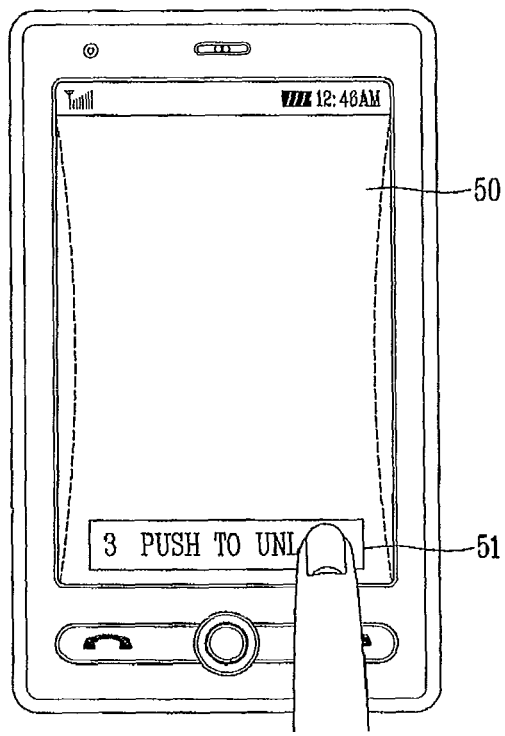
FIGS. 11A to 11D are exemplary views showing processes by which a threshold value is changed and the shape of a screen is changed according to a touch value, in accordance with an embodiment of the present invention.
Figure 11B:
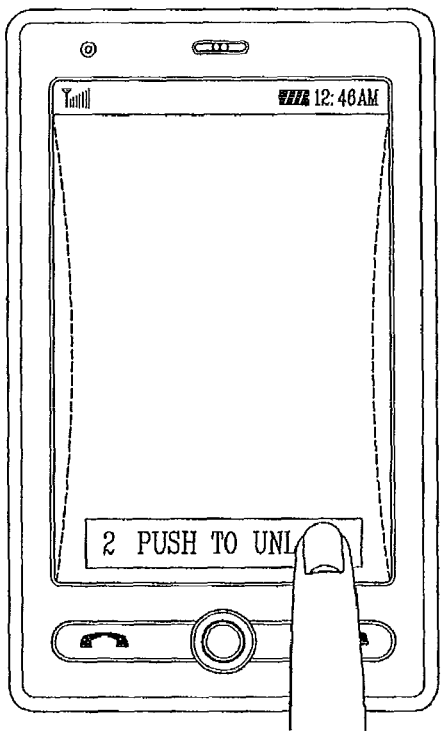
Figure 11C:
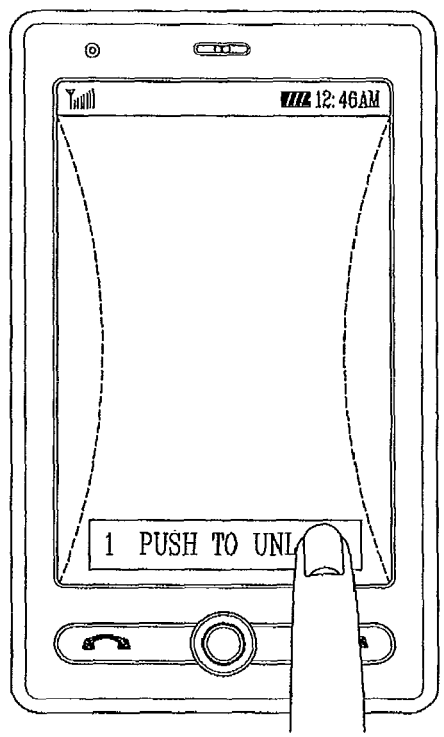
Figure 11D:
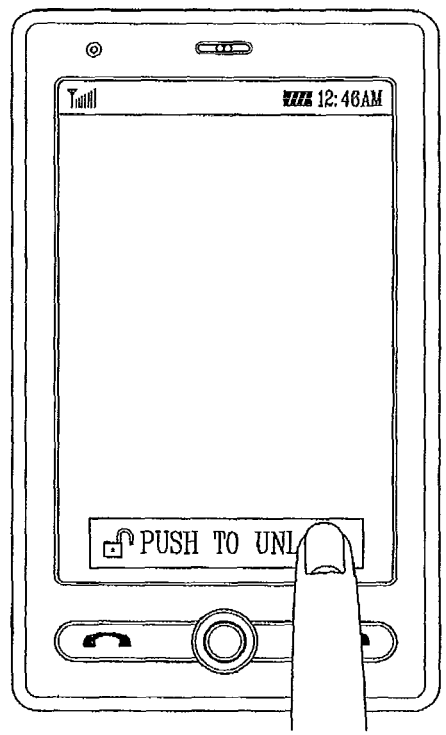

FIG. 10 is a flowchart showing the changes in the lock screen when the touch region 51-2 of the key block 51 is touched in FIG. 9.

As shown in FIG. 10, upon a touch detection (S20), the controller 180 displays the threshold value on the display region 51-1, and thereafter displays the change in the threshold value according to the touch value (i.e., touch time or touch area) (S21). The present invention may display the change in the threshold value by decreasing or increasing the threshold value.

Further, the controller 180 changes the displayed form of the lock screen 50 according to the change in the threshold value due to the touch time (or touch area) (S22). That is, the controller 180 may change the shape and size of the lock screen 50 or outputs an effect sound according to the change in the threshold value (S22), so as to lively indicate (represent) that an attempt to release the locked state is being made.

Afterwards, when the touch value (i.e., touch time or touch area) reaches the threshold value, that is, if the touch value is increased from "0" to become (reach) the threshold value or decreased from the threshold value to become (reach) "0", the controller 180 then controls the lock screen 50 formed in a form of cube to rotate, thereby allowing the lock screen 50 to be disappeared and the menu screen to be appeared (S23). Hereinafter, each step shown in FIGS. 9 and 10 will be described in detail with reference to the accompanying drawings.

FIGS. 11A to 11D are exemplary views showing the process in which a threshold value is changed according to a touch value and the shape of the lock screen is changed in accordance with the present invention.

As shown in FIGS. 11A to 11D, when the user touches the key block 51, the controller 180 controls the threshold value to be displayed on the display region 51-1 in the order of 3-second→2-second→1-second according to a touch time. Then, the controller 180 controls the lock screen 50 in correspondence with each touch time such that its right and left sides are shrunk toward a middle portion (or its upper and lower sides are shrunk from side to side), so as to indicate (represent) that the attempt to release the locked state of the mobile terminal is being conducted. Under this state, when 3 seconds corresponding to the threshold value all elapse, the controller 180 displays a "specific shape (e.g., padlock)" indicating that the locked state is released on the display region 51-1, other than the elapsed time, and then displays a menu screen 52 instead of the lock screen 50. Also, the present invention may be implemented to output vibration or sounds in association with the changes in the shape and size of the lock screen 50.

Figure 12:
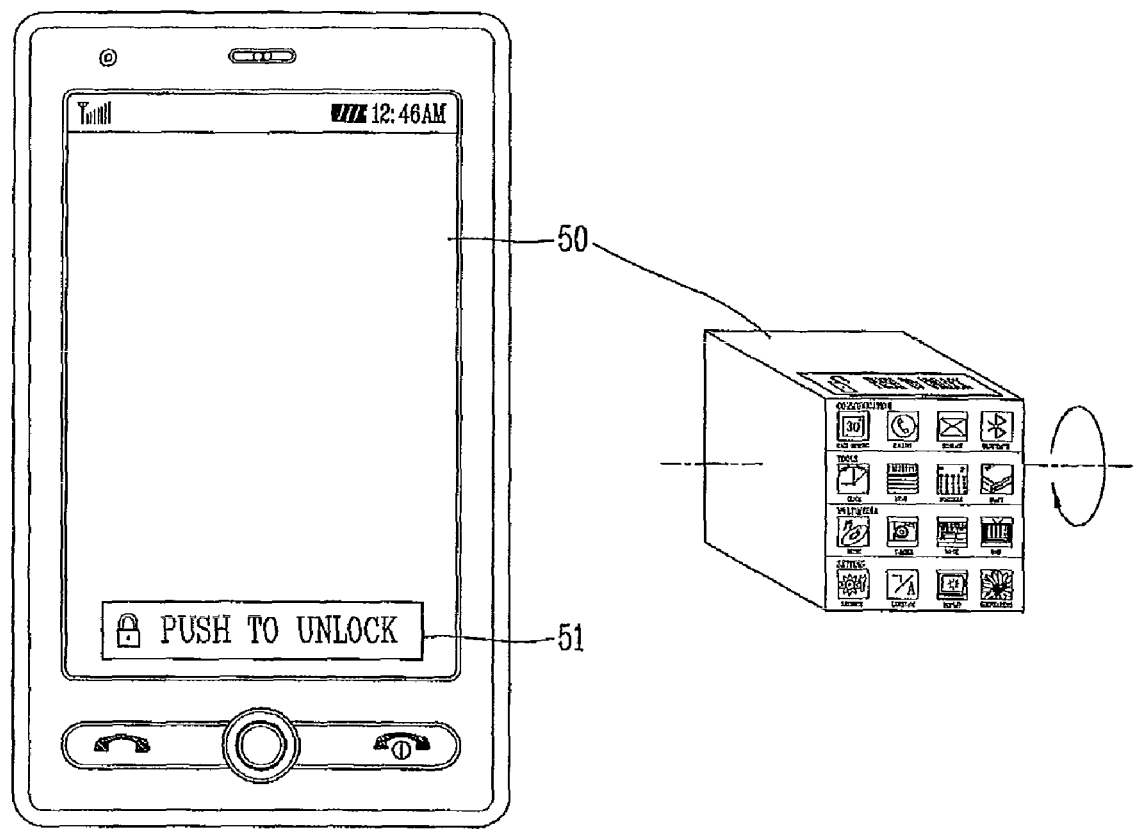
FIG. 12 is an exemplary view showing a principle that a lock screen is switched to a menu screen when a touch value reaches a threshold value.
Figure 13:
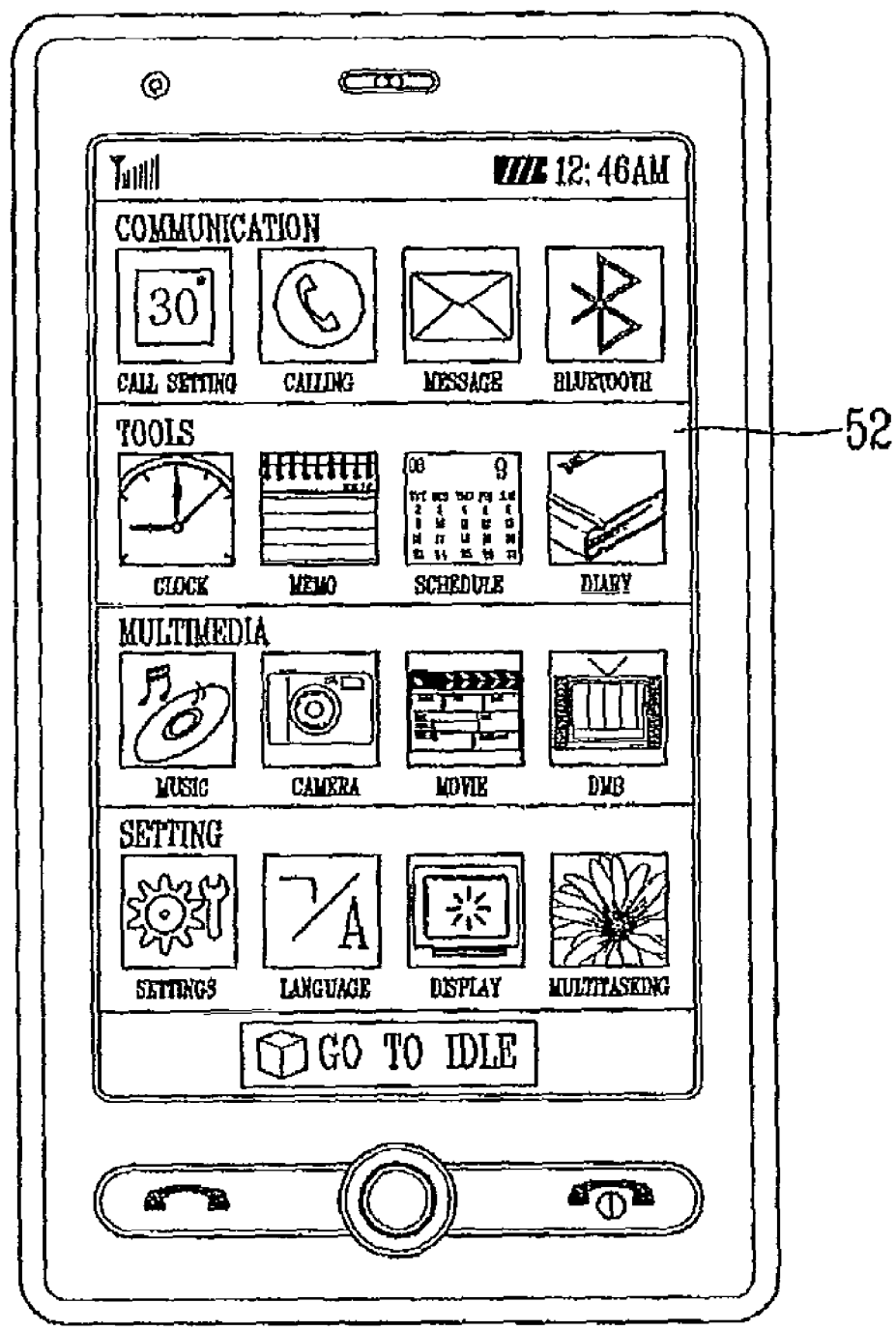
FIG. 13 is a view showing a screen displayed after the lock screen is switched to the menu screen in accordance with the embodiment of the present invention.

FIG. 12 shows a principle as to how the lock screen is switched to the menu screen when a touch value input on the key block reaches a threshold value, and FIG. 13 shows the menu screen after the screen switching (conversion).

As shown in FIG. 12, it can be noticed that the lock screen 50 is one surface without any menu displayed, among six surfaces of a cube. Accordingly, when a touch value reaches a threshold value, the controller 180 controls the cube such that the surface corresponding to the lock screen 50 is disappeared upwardly and a surface having menus displayed is appeared from the bottom, thereby switching the lock screen 50 to the menu screen 52, as shown in FIG. 13. Further, in case where the lock screen 50 is configured to be moved from side to side, if the touch value reaches the threshold value, the controller 180 may control the cube such that the surface corresponding to the lock screen 50 is disappeared to the right (or left) side and the surface having menus displayed is appeared from the left (or right) side.

Figure 14A:
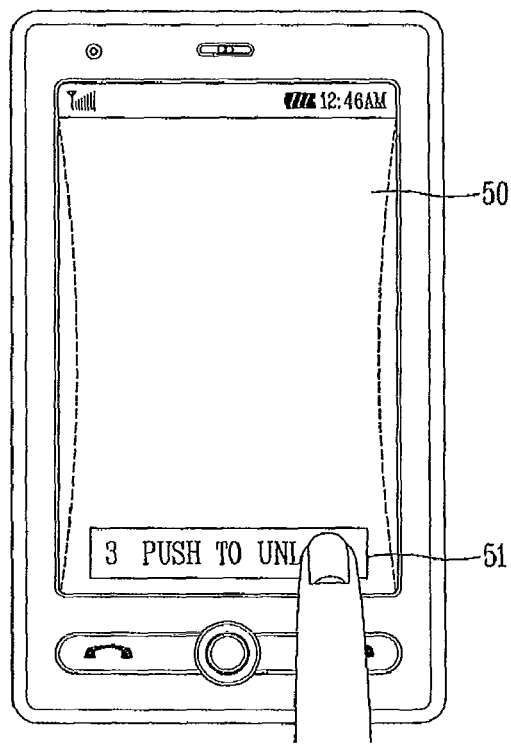
FIGS. 14A to 14C are views showing a screen displayed when a touch input is released before a touch value reaches a threshold value, in accordance with an embodiment of the present invention.
Figure 14B:
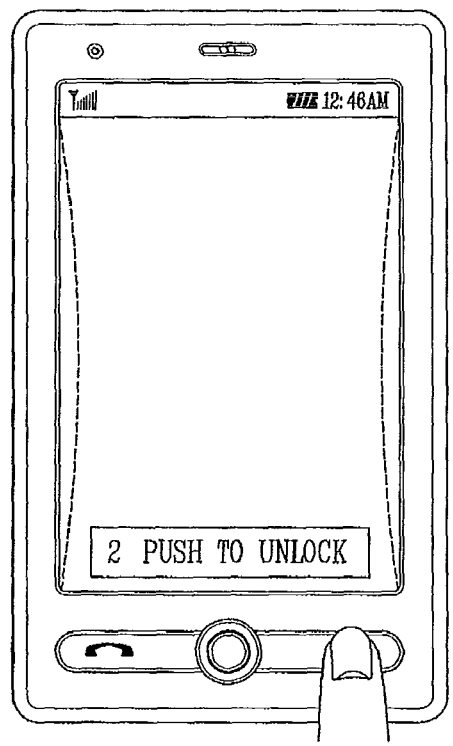
Figure 14C:
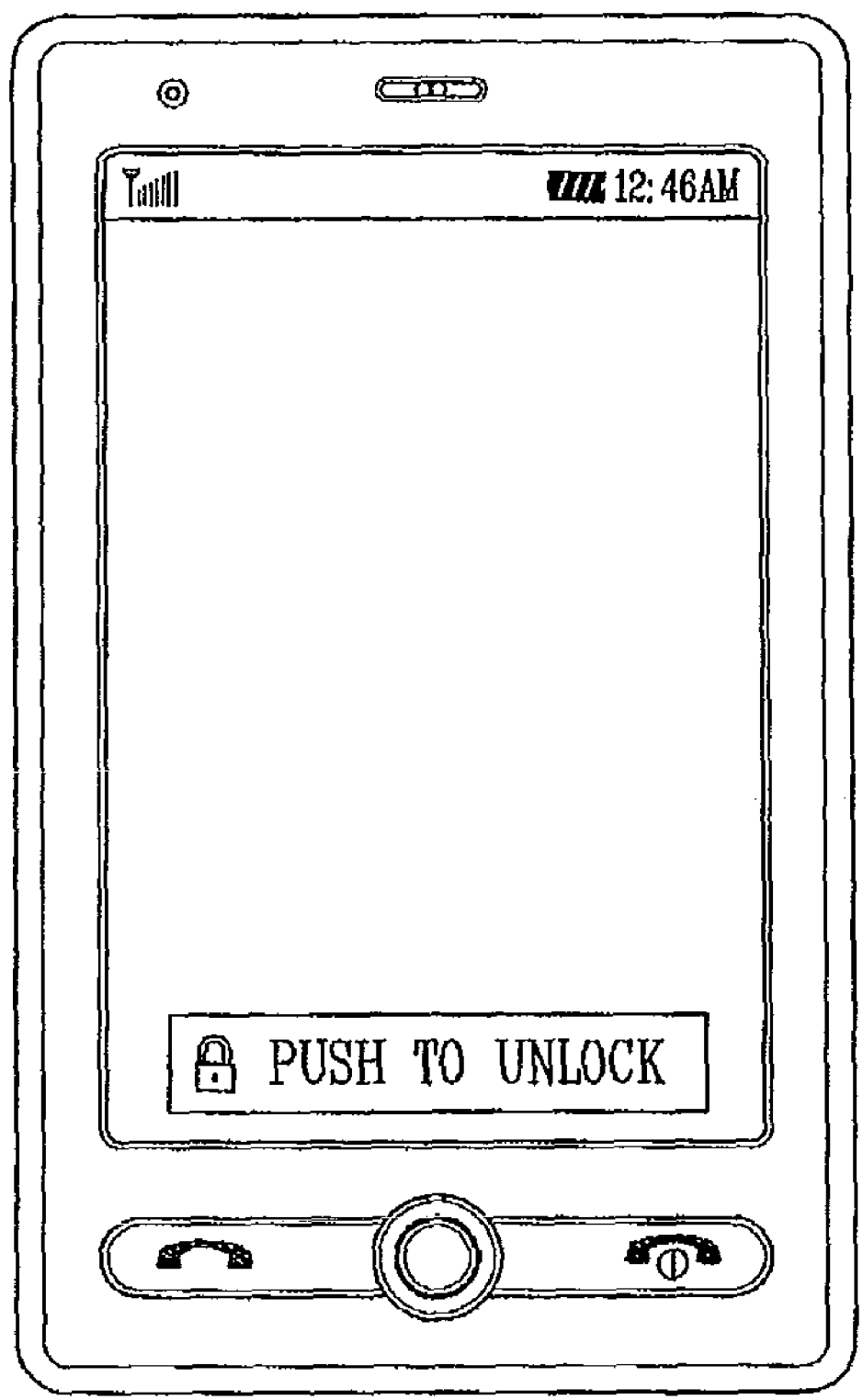

FIGS. 14A to 14C are exemplary views showing a screen displayed when a user releases a touch input before a touch value reaches a threshold value in accordance with an embodiment of the present invention.

In the present invention, the screen switching from the lock screen 50 to the menu screen 52 is executed at the time when the locked state is released, and the release of the locked state is implemented only when the touch value reaches the threshold value. Thus, as shown in FIGS. 14A to 14C, after touching the key block 51, if the user releases the touch input (e.g., takes his finger away from the key block 51) before reaching a threshold value (e.g., at a time when two seconds elapses) (see FIG. 14B), then the controller 180 recovers the shape and the size of the lock screen 50 to its initial state, as shown in FIG. 14C.

Figure 15:
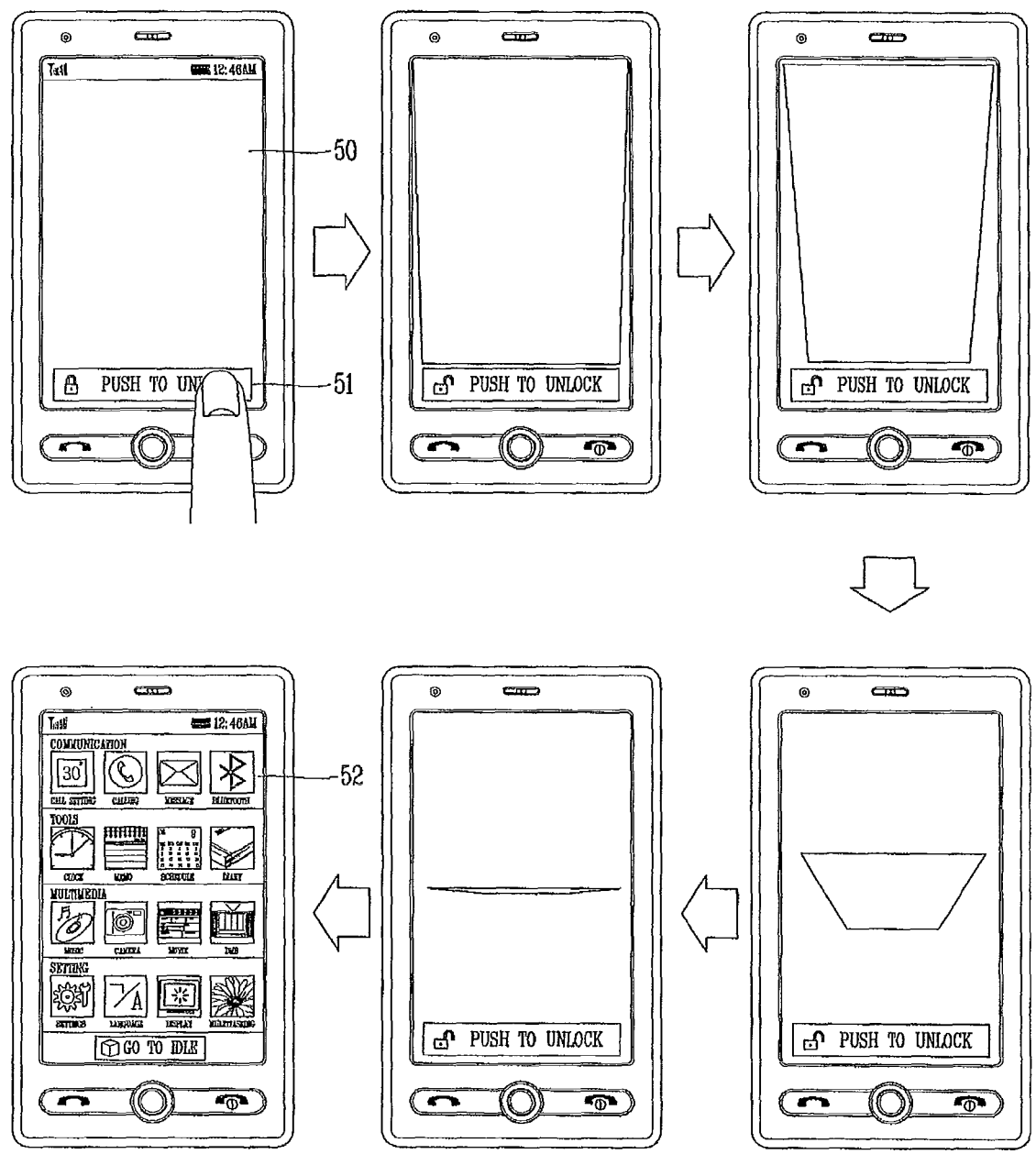
FIGS. 15 and 16 are views showing that a lock screen is switched to a menu screen according to the principle shown in FIG. 12.
Figure 16:
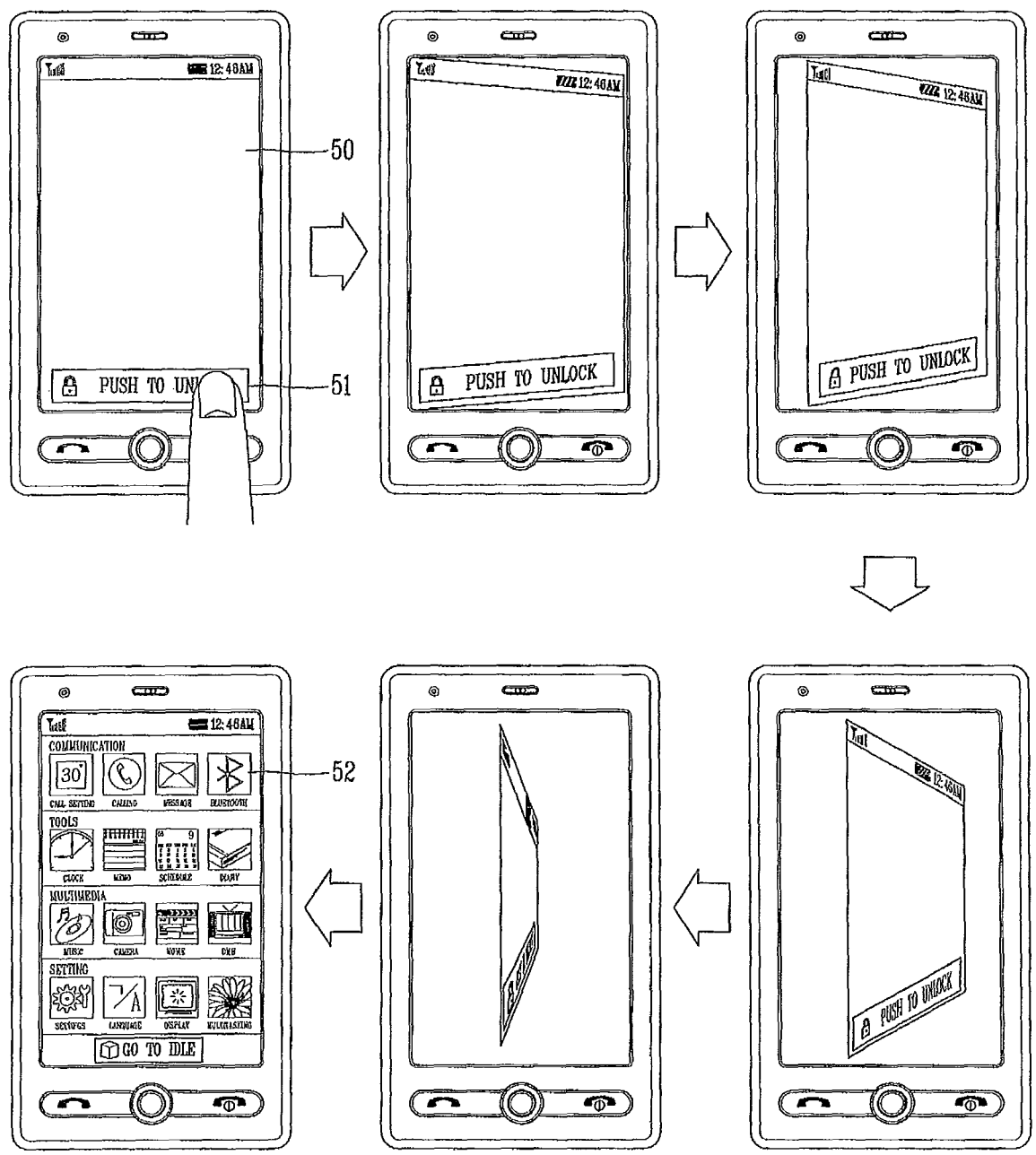
Figure 17A:
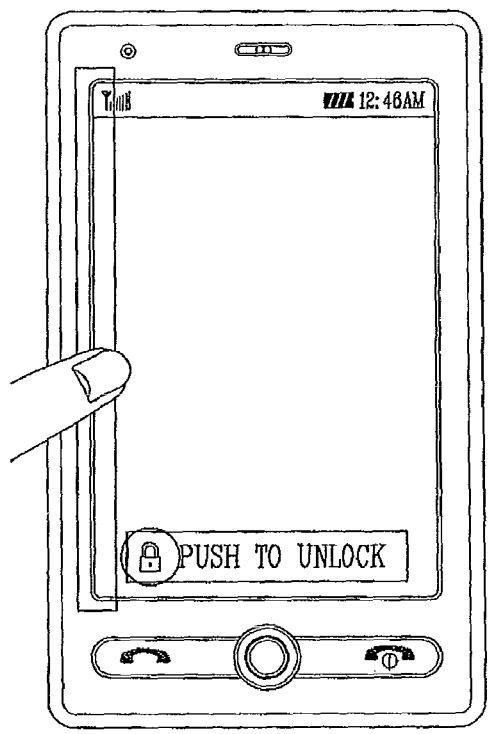
FIG. 17 is an exemplary view showing that a lock screen is switched to a menu screen upon touching a side surface of the lock screen, in accordance with another embodiment of the present invention.
Figure 17B:
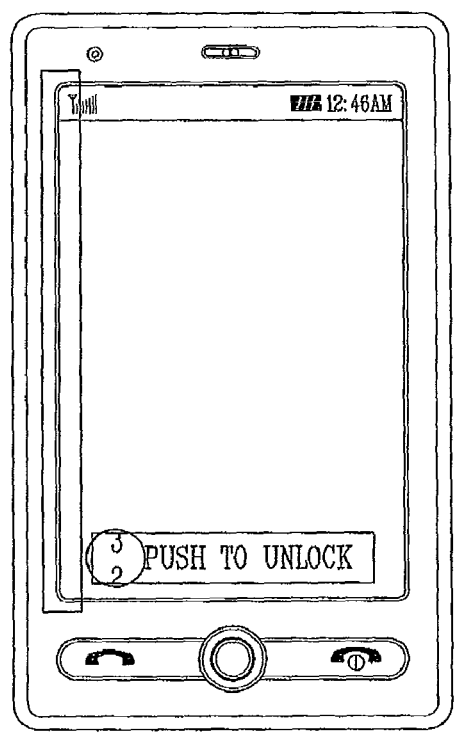
Figure 17C:
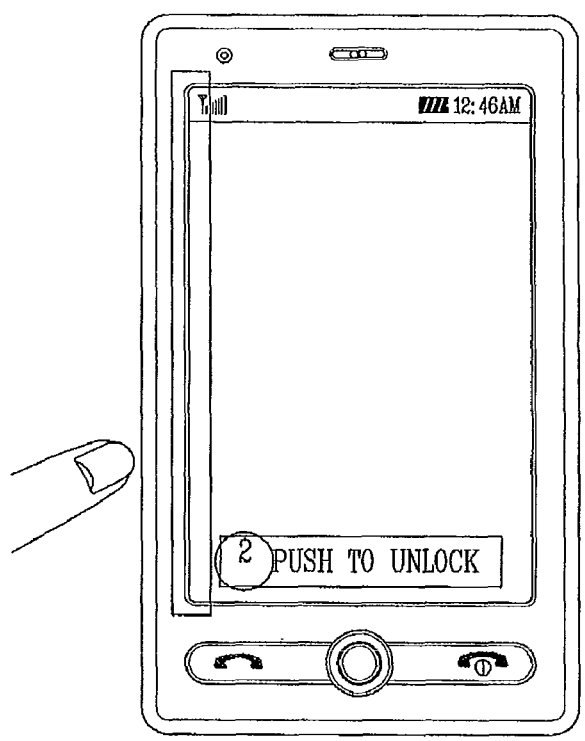
Figure 17D:
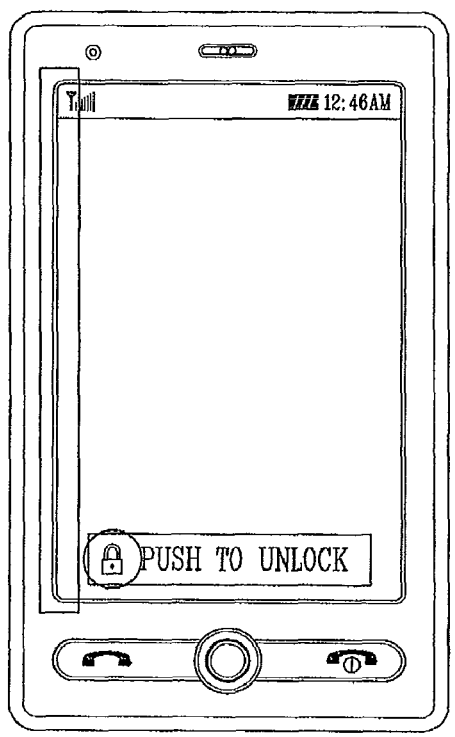

FIGS. 15 and 16 are exemplary views sequentially showing an operation of the lock screen 50 being switched to the menu screen 52 according to the principle shown in FIG. 12.

As shown in FIGS. 15 and 16, when a touch value input on the key block 51 reaches a threshold value, in the state of an unlock indication (e.g., unlocked padlock) being displayed, the lock screen 50 is switched to the menu screen 52 by an effect that the cube is rotated. Here, the embodiment of FIG. 15 exemplarily shows that the lock screen 50 rotates upward and downward and the embodiment of FIG. 16 exemplarily shows that the lock screen 50 rotates right and left.

FIG. 17 is an exemplary view showing the switching of the lock screen to the menu screen by way of touching a side surface of the lock screen, in accordance with another embodiment of the present invention.

As shown in FIG. 17, when a user touches a right surface of the lock screen 50, the controller 180 displays the changed state of the touch value on the key block 51 and the state of the locked state being released, and simultaneously changes the shape of the lock screen 50. Afterwards, upon the touch value reaching the threshold value, the controller 180 switches the lock screen 50 to the menu screen 52. The embodiment shown in FIG. 17 shows a different touch position, and a detailed operation thereof is the same to the embodiment shown in FIG. 15 or FIG. 16.

Figure 18:
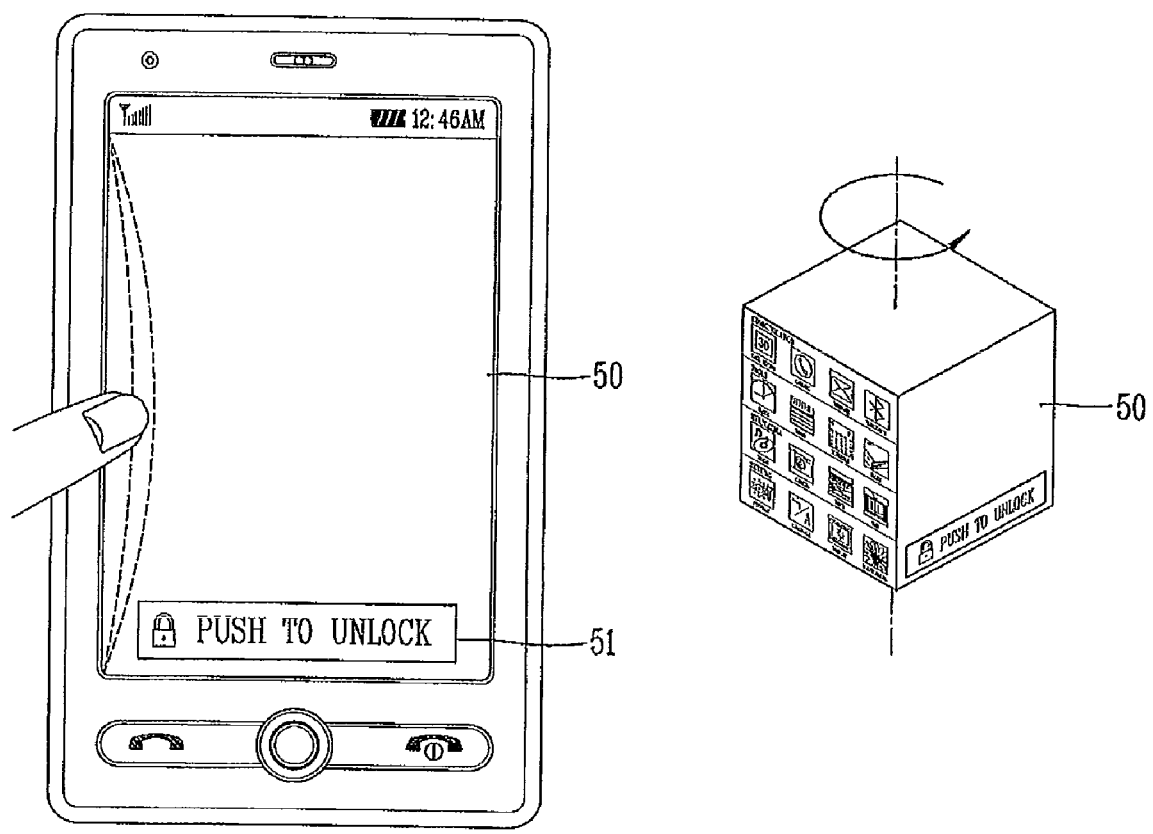
FIG. 18 is an exemplary view showing that a lock screen is switched to a menu screen when a touch value reaches a threshold value in FIG. 17.

FIG. 18 is an exemplary view showing that the lock screen is switched to the menu screen when the touch value reaches the threshold value in FIG. 17, which also uses a rotation effect of a cube as shown in FIG. 12.

FIG. 18 shows an embodiment in which a side surface of the lock screen 50 is touched by a finger, and then the shape and size of the lock screen 50 is changed according to a touch value (e.g., touch time or touch area). When the touch value reaches the threshold value, the controller 180 makes a cube surface corresponding to the lock screen 50 move to the right side such that a cube surface having menus displayed can be appeared on a screen, thereby switching the lock screen 50 to the menu screen 52 as shown in FIG. 13. Here, vibration or sound may be output in association with the changes in the shape and size of the lock screen 50.

The aforementioned embodiments have illustrated that a locked state is released or a menu screen is displayed according to a preset touch input (e.g., a preset touch time, a preset number of touch times or a preset touch area) in a lock mode. However, with limitation to the example, different menus may be open according to the type of touch.

For instance, a locked state may be merely released by a preset short touch input in a lock mode. A typical menu screen is open by a preset long touch input for 2~3 seconds. Also, a favorite search or emergency mode may be open by a preset long touch input for more than 4 seconds.

Figure 19A:
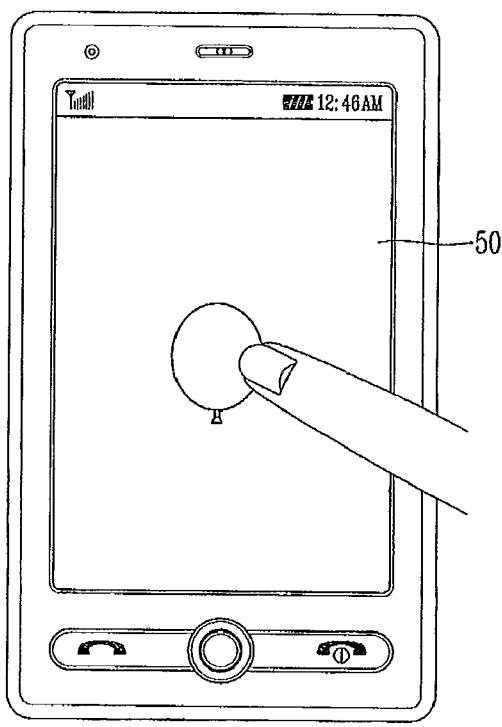
FIGS. 19A and 19B are exemplary views showing that a lock screen is switched to a menu screen when a touch value reaches a threshold value, in accordance with another embodiment of the present invention.
Figure 19B:
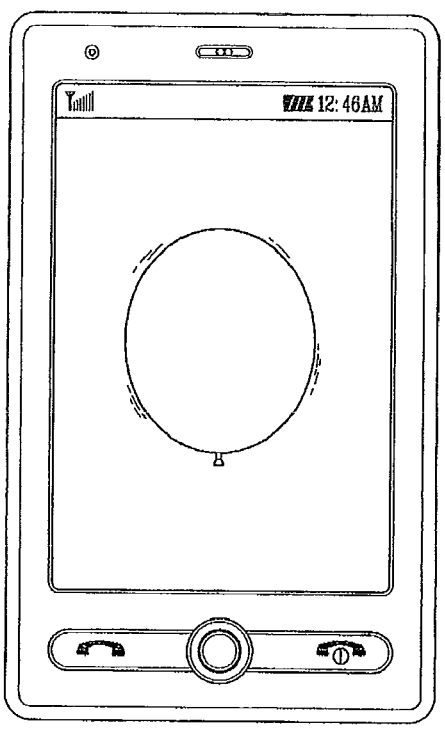

FIGS. 19A and 19B exemplarily show a principle that the lock screen is switched to the menu screen when the touch value reaches the threshold value, in accordance with another embodiment of the present invention.

In the embodiment shown in FIGS. 19A and 19B, a balloon, a frog or the like is displayed on the lock screen 50 instead of the key block 51, and thus the balloon or the belly of the frog may swell out according to the change in the touch value. At the time of reaching the threshold value, the lock screen 50 may be switched to the menu screen 52 after displaying a state that the balloon is popped or the frog is fallen down. Here, vibration or sound may also be output in association with the change in the shape of the balloon or the frog.

Also, without limitation to the example, the present invention may be implemented such that an avatar (e.g., fish, bird, bee or other movable animal or plant), which is size-changeable and movable, or an animation containing a story is displayed on the lock screen 50, and thus the movement of the avatar, for example, is faster or a flower blooms according to the change in the touch value. In this case, the lock screen 50 is switched to the menu screen 52 after displaying the last state of the avatar, for example, at the time when the touch value reaches the threshold value.

As described above, in the present invention, both the change in shape and size of a lock screen and a threshold value are displayed (represented) according to a touch input value (e.g., touch time or touch area), and when the touch value reaches the threshold value, a locked state is released and the lock screen is switched to a menu screen, thereby obtaining an effect of providing a user interface (UI) which makes a user more enjoyable and excited.

The aforesaid methods according to one embodiment of the present invention can be implemented as computer-readable codes in a program-recorded medium. The computer-readable medium may include all types of recording devices each storing data readable by a computer system.

Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An event control method of a mobile terminal comprising:
    displaying a lock screen;
    detecting a touch input on the lock screen;
    changing a shape of the lock screen according to a change in a touch input value to represent that an attempt for unlocking the screen is being made; and
    switching the lock screen to a menu screen when the touch input value reaches a threshold value.

2. The method of claim 1, wherein the touch input comprises a real-touch and a proximity touch.

3. The method of claim 1, wherein the touch input value comprises one of a touch time, a touch area and the number of touch times.

4. The method of claim 1, wherein the lock screen denotes a surface without a menu displayed, among the whole surfaces of a cube.

5. The method of claim 1, wherein the lock screen comprises a key block with a specific shape and size for unlocking the screen.

6. The method of claim 5, wherein the key block comprises:
a display region disposed at one side; and
a touch region occupying the other portion excluding the display region for detecting a touch input.

7. The method of claim 6, wherein the display region displays the threshold value and a shape indicating an unlocked state of a screen, and
wherein the touch region displays a shape indicating a locked state of the screen and a phrase for guiding an unlocking method.

8. The method of claim 1, wherein the touch input is performed by touching a key block separately disposed at one side of the screen.

9. The method of claim 1, wherein the touch input is performed by touching one side of the screen.

10. The method of claim 1, wherein the threshold value is displayed by being decreased or increased in a touched state.

11. The method of claim 1, wherein vibration or sound is output in association with the change in the shape and size of the screen.

12. The method of claim 1, further comprising:
returning to an initial state when the touch input is released before the touch input value reaches the threshold value.

13. A mobile terminal comprising:
a sensing unit configured to detect a touch input;
a display configured to display a lock screen with a specific touch region; and
a controller configured to change a shape of the lock screen according to a change in a detected touch input value to represent that an attempt to unlock the screen in being made, and switch the lock screen to a menu screen when the detected touch input value reaches a threshold value.

14. The terminal of claim 13, wherein the touch input comprises a real-touch and a proximity touch.

15. The terminal of claim 13, wherein the touch input value comprises one of a touch time, a touch area and the number of touch times.

16. The terminal of claim 13, wherein the display comprises:
a lock screen; and
a key block disposed on a specific portion on the lock screen and receiving a touch input thereon, the key block having a separate display region for displaying the threshold value.

17. The terminal of claim 13, wherein the display comprises various avatars each having shape, size and movement all changed according to the change in the touch input.

18. The terminal of claim 13, wherein the controller is further configured to generate vibration and sound in association with the change in the shape and size of the lock screen.

19. The terminal of claim 13, wherein the controller recovers the shape and size of the lock screen to an initial state when the touch input is released before the touch input value reaches the threshold value.

* * * * *